United States Patent Office.

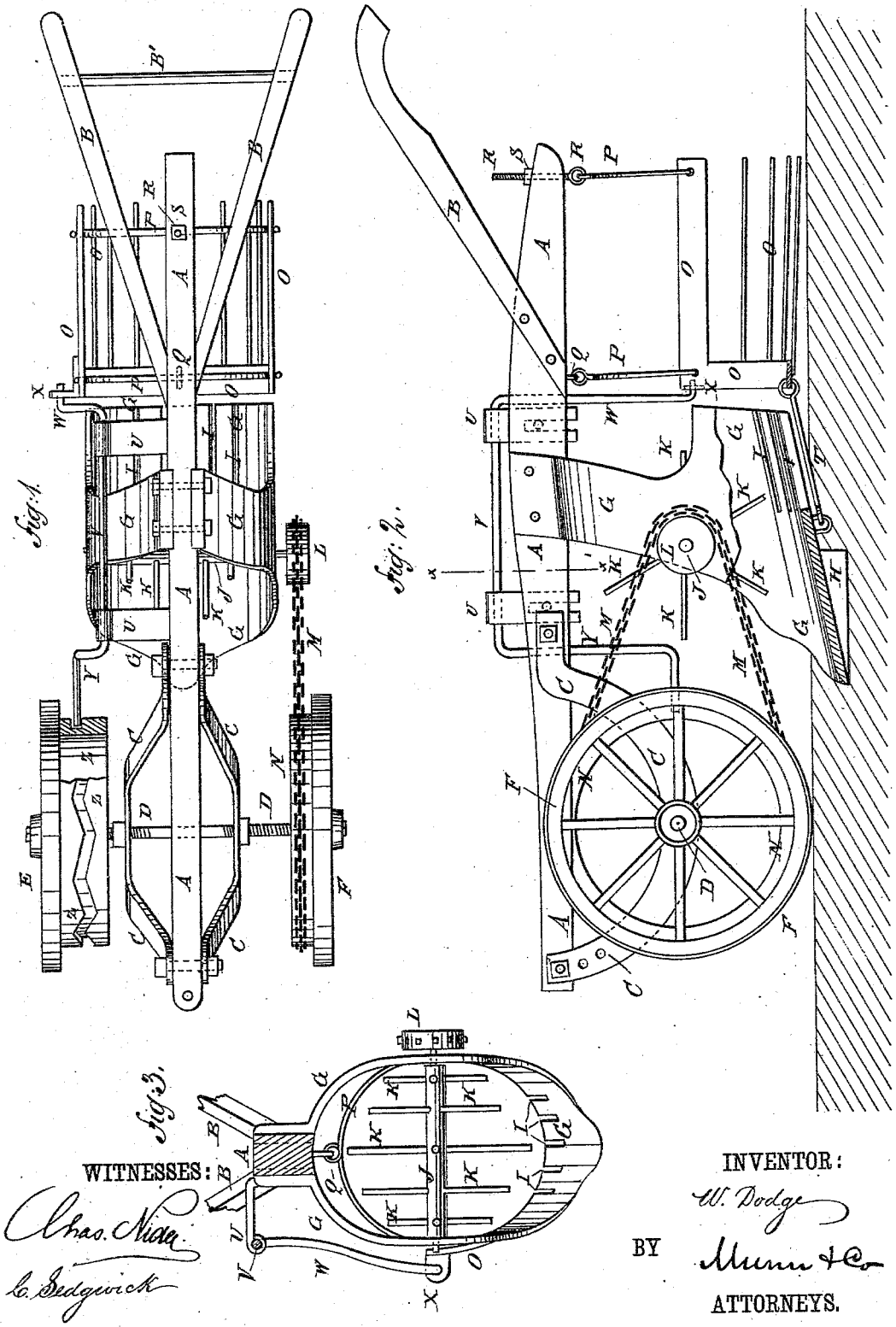

WILLIS DODGE, OF PRESQUE ISLE, MAINE, ASSIGNOR OF ONE-HALF TO GEORGE M. LUCE, OF SAME PLACE.

POTATO-DIGGER.

SPECIFICATION forming part of Letters Patent No. 296,541, dated April 8, 1884.

Application filed December 13, 1883. (No model.)

*To all whom it may concern:*

Be it known that I, WILLIS DODGE, of Presque Isle, in the county of Aroostook and State of Maine, have invented certain new and useful Improvements in Potato-Diggers, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a side elevation of the same, partly in section. Fig. 3 is a sectional end elevation of the same, taken through the line $x\,x$, Fig. 2.

The object of this invention is to facilitate the operation of digging potatoes, and also to promote convenience in controlling and operating potato-diggers.

The invention consists in the several combinations of parts and their construction, substantially as hereinafter fully set forth, and pointed out in the claims.

A represents a beam similar to a plow-beam. To the rear part of the beam A are attached the forward ends of the handles B, the rear parts of which are connected and held in their proper relative positions by a round, B', attached to them.

To the opposite sides of the forward end of the beam A are attached the forward ends of two bars, C, which are curved downward, outward, rearward, inward, and upward, and are secured at their rear ends to the opposite sides of the beam A, a little in front of its center.

To the middle parts of the bars or hangers C is attached the axle D of the drive-wheels E F. Several holes are formed in the bars C to receive the fastening-bolts, so that the beam A can be readily raised and lowered to cause the scoop G to work shallower or deeper in the ground, as may be required. The scoop G is made semi-cylindrical in form, with an angular forward end and a square rear end. The middle parts of the sides of the scoop G are extended upward, and are bolted to the opposite sides of the beam A, a little in the rear of its center.

Upon the forward part of the lower side of the scoop G is formed a shoe, H, to give steadiness of motion to the said scoop. The rear part of the bottom of the scoop G has slots I formed in it, to allow the loose soil to fall to the ground as the soil and potatoes pass back over the said bottom.

To the sides of the scoop G is journaled a shaft, J, to which are attached radial arms K, which, as the said shaft is revolved, loosen the potatoes and soil and feed them back through the scoop to prevent the said scoop from becoming clogged.

To one journal of the shaft J is attached a small chain-wheel, L, around which passes an endless chain, M. The chain M also passes around a large chain-wheel, N, attached to or formed upon the side of the drive-wheel F, so that the stirrer J K will be operated by the advance of the machine. As the soil and potatoes pass from the rear end of the scoop G they are received upon the screen O, which is made semi-cylindrical in form, and to the forward and rear corners of which are hinged the ends of two bails, P. The forward bail P is hinged at its center to the beam A by a staple or eyebolt, Q, and the rear bail P is hinged at its center to the beam A by a long eyebolt, R, which has a nut, S, screwed upon it above the said beam, so that by adjusting the said nut a greater or less downward inclination can be given to the rear end of the screen O, as the character of the soil may require.

To the center of the forward end of the screen O is hinged the rear end of a rod, T, the forward end of which is hinged to the middle part of the lower side of the bottom of the scoop G, so as to prevent the screen O from swinging back from the rear end of the scoop G so far as to allow potatoes to drop through between the said scoop and screen.

To the middle part of the beam A are attached two arms, U, which are slotted to receive the fastening-bolts, so that the said arms can be readily adjusted higher or lower, as may be required. The upper parts of the arms U project outward, and in their outer ends are formed bearings, in which rocks the rod V, upon the rear end of which is formed, or to it is attached, a crank-arm, W. The end of the crank-arm W is hooked into a lug, X, attached to the forward corner of the screen O, so that the said screen will be agitated by the movements of the said crank to separate the potatoes and soil, the soil passing through the interstices of the screen and the potatoes dropping from the rear end of the said screen upon the surface of the ground, so that they can be readily gathered.

Upon the forward end of the shaft or rod V is formed, or to it is attached, a crank-arm, Y, the end of which enters in a zigzag groove formed in the face of a wheel or flange, Z, formed upon or attached to the side of the drive-wheel E, so that the crank-rod V will be rocked with a quick movement by the advance of the machine.

Having thus described my invention, what I claim as new, and desire to secure by Letters Patent, is—

1. In a potato-digger, the combination, with the draft-beam, with its wheels, and the scoop, of the shaker or screen pivotally suspended from said beam, and the approximately U-shaped crank-shaft, with its lower forward end provided with a forward extension engaging a zigzag-grooved or cam disk on one of the aforesaid wheels, and with its lower rear end provided with a rearward extension connected to said screen or shaker, substantially as and for the purpose set forth.

2. In a potato-digger, the combination of the draft-beam, the approximately U-shaped crank-shaft connected to the screen or shaker connected to the scoop, said shaft also connecting with a cam-disk, and the right-angled arms supporting said shaft and adjustably connected to said beam, substantially as and for the purpose set forth.

WILLIS DODGE.

Witnesses:
CHAS. P. ALLEN,
A. C. DODGE.